CHARACTER RECOGNITION EMPLOYING PLURAL DIRECTIONAL SCANNING

Filed Nov. 23, 1962 7 Sheets-Sheet 1

INVENTOR
JOHN G. BAUMBERGER
BY Paul D. Carmichael
ATTORNEY

March 22, 1966 J. G. BAUMBERGER 3,242,463

CHARACTER RECOGNITION EMPLOYING PLURAL DIRECTIONAL SCANNING

Filed Nov. 23, 1962 7 Sheets-Sheet 2

| CHARACTER | VERTICAL LOWER (VL) | VERTICAL CENTER (VC) | VERTICAL UPPER (VU) | HORIZONTAL UPPER LEFT (HUL) | HORIZONTAL LOWER LEFT (HLL) | HORIZONTAL UPPER RIGHT (HUR) | HORIZONTAL LOWER RIGHT (HLR) |
|---|---|---|---|---|---|---|---|
| 0 | ✦ | | | ✦ | ✦ | ✦ | ✦ |
| 1 | ✦ | | | | | ✦ | ✦ |
| 2 | ✦ | ✦ | ✦ | | ✦ | ✦ | |
| 3 | ✦ | ✦ | ✦ | | | ✦ | ✦ |
| 4 | ✦ | ✦ | | ✦ | | ✦ | ✦ |
| 5 | ✦ | ✦ | ✦ | ✦ | | | ✦ |
| 6 | ✦ | ✦ | | ✦ | ✦ | | ✦ |
| 7 | ✦ | | ✦ | ✦ | | ✦ | ✦ |
| 8 | ✦ | ✦ | ✦ | ✦ | ✦ | ✦ | ✦ |
| 9 | ✦ | ✦ | ✦ | ✦ | | ✦ | |

✦ CHARACTER INFORMATION PRESENT.

March 22, 1966 J. G. BAUMBERGER 3,242,463

CHARACTER RECOGNITION EMPLOYING PLURAL DIRECTIONAL SCANNING

Filed Nov. 23, 1962 7 Sheets-Sheet 4

United States Patent Office 3,242,463

Patented Mar. 22, 1966

3,242,463
CHARACTER RECOGNITION EMPLOYING PLURAL DIRECTIONAL SCANNING

John G. Baumberger, Johnson City, N.Y., assignor to International Business Machines Corporation, New York, N.Y., a corporation of New York Filed Nov. 23, 1962, Ser. No. 239,683
16 Claims. (Cl. 340—146.3)

The present invention relates generally to the character recognition art and more particularly to a system for automatically recognizing and providing output signals corresponding to and representative of human language symbols or characters.

Systems have previously been developed and are in use for reading and recognizing human language symbols or characters, printed or otherwise formed on documents. A first class of these systems employs characters printed on a document with a magnetizable ink. In reading operations, the characters are magnetized and moved relative to one or more magnetic transducers to produce electrical signals representative of the sensed characters. A second class of character recognition systems is based on optical principles. One or more sensing devices, such as photomultiplier tubes, are used in conjunction with a scanning means to examine contrasting characters printed on a document and provide electrical signals corresponding to the characters.

In all character recognition systems, one of the main problems is that of compensating for differences in registration of symbols or groups of symbols. The term registration, as used in the art and the present specification, is defined as the relative position of an individual character or group of characters with respect to a preselected reference, such as the edge of a document, another character, a special registration symbol, the scanning means of the character reading system or the like. Even when the printing of the characters on documents is very accurately controlled and highly refined printing apparatus is employed, the spacing between and vertical alignment of the individual characters or groups of characters is likely to vary. The problem of character registration is greatly accentuated in certain integrated data processing applications where the source documents are printed at different locations on inexpensive apparatus operated by relatively unskilled personnel. For example, in credit card applications, the imprinters are highly simplified and sales people prepare documents at different locations as an incident to other duties. A character or group of characters may be displaced vertically with respect to a preselected reference by one-half or more of the vertical dimension of a character.

Briefly, the present invention relates to a character recognition system for reading and recognizing human language symbols or characters having improved means for compensating for the misregistration of characters in either or both of two angularly related directions with respect to a preselected reference. A document having contrasting characters thereon is advanced by transport means past a sensing station where the characters are successively illuminated. An image of a character at the sensing station is transmitted to each of a plurality of reading and registration stations. Each of the reading and registration stations comprises at least a pair of cooperating and relatively movable apertures operative to scan incremental areas of the transmitted character image associated with the reading station. At the reading stations, the images of the character are scanned in a plurality of directions which are angularly related with respect to each other. The position of a character with respect to two angularly related axes is sensed at the registration stations so that the character recognition system is operative to read and recognize misaligned characters. The scanning means at the reading stations superimpose an imaginary matrix over the images of a character and examine for the presence or absence of character information at certain points within the matrix. In the illustrated embodiment of the invention, a stylized font is employed which, when used in connection with the scanning patterns disclosed, allows the reading stations to provide electrical signals individual to each of the characters of the font. Recognition logic means process these signals to produce an output indication of the character at the sensing station.

It is the primary or ultimate object of this invention to provide a character recognition system having improved means for sensing the registration of a character with respect to at least two angularly related axes. The horizontal and vertical positions of each character are sensed and this information is employed to control the reading operation.

Another object of this invention is to provide a character recognition system wherein a character is simultaneously scanned for at least a portion of the reading operation in a plurality of angularly related directions. This is accomplished by providing an image of a character at a sensing station to each of a plurality of reading stations.

Still another object of the invention is to provide a character recognition system which is operative to scan a character in a plurality of directions wherein scanning in one direction precedes scanning in another direction by a preselected time interval. The arrangement is such that the positions of the character with respect to the scanning axes are sensed in immediately following relation by the registration stations to control the operation of the reading stations.

A further object of the invention is to provide a character recognition system of the type set forth above which is particularly adapted for use with a stylized font whereby the characters of the font are read and recognized with an extremely high degree of accuracy. The characters of the font distinctly convey human language information and are easily read by an individual. For the numerals 0 through 9, the characters are distinguished from each other by at least two machine recognizable characteristics, and this insures extremely reliable character reading operations wherein instances of the system being unable to recognize a character or providing an output indication which does not correspond to the sensed character are maintained at an absolute minimum.

Yet a further object of the invention is to provide a character recognition system having the characteristics above described which embodies improved recognition logic means. The logic means is highly simplified since the registration of a character with respect to a plurality of angularly related directions is sensed at the registration stations and controls the reading operation.

A further object of the invention is to provide an improved optical scanning means for examining characters printed on documents which contrast with their backgrounds. An optical system provides an image of each character at a number of spaced reading and registration stations. The reading and registration stations are defined by cooperating and relatively movable apertures in an otherwise opaque scanning disc and an otherwise opaque masking plate. The masking plate mounts a plurality of optical-to-electrical transducers for converting the sensed optical information concerning preselected incremental areas of each character to corresponding electrical signals.

A still further object of the invention is to provide a character recognition system of the type described above which is highly reliable and is characterized by its extreme simplicity in construction and operation.

The foregoing and other objects, features and advantages of the invention will be apparent from the following more particular description of a preferred embodiment of the invention, as illustrated in the accompanying drawings.

Figure 1:
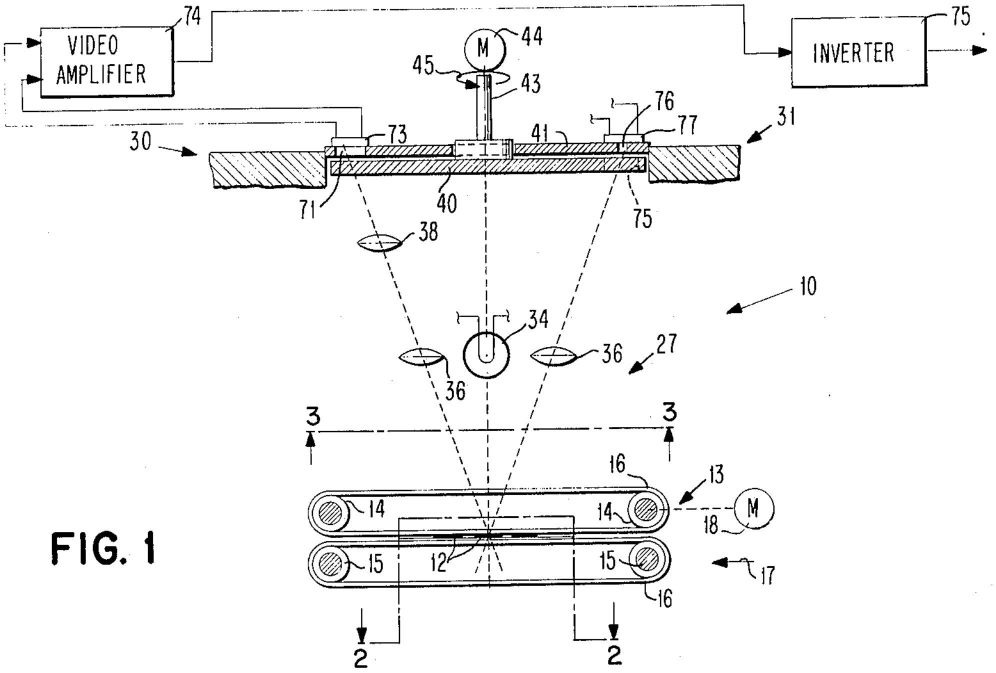
FIGURE 1 is a side view, partially in section, showing a sensing station forming a portion of a character recognition system constructed in accordance with the teachings of the present invention.
Figures 2, 3:
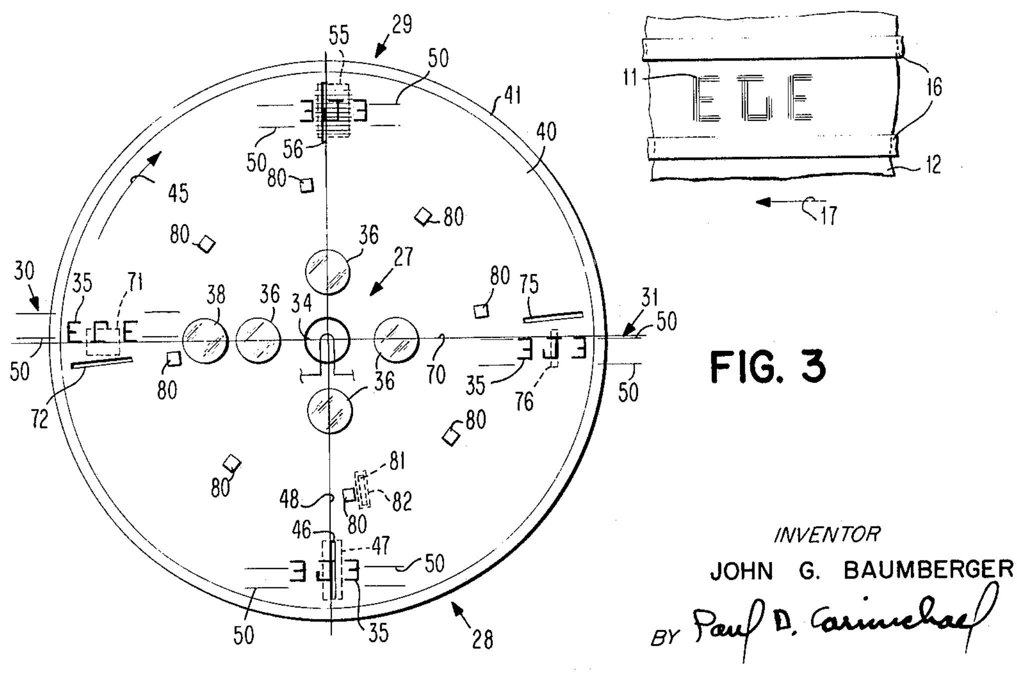
FIGURE 2 is a fragmentary plan view taken along the section line 2—2 of FIGURE 1 illustrating a document with characters printed thereon.
FIGURE 3 is an underside plan view of the reading and registration stations as seen from the section line 3—3 of FIGURE 1.

Referring now to the drawings, there is shown a character recognition system embodying the teachings of this invention which comprises a sensing station 10 for examining contrasting characters 11 printed or otherwise formed on documents 12. The documents 12 are conveyed in successive relation past the sensing station 10 by a document transport means 13. This transport means is schematically represented by spaced and laterally extending pairs of upper and lower drive rolls 14 and 15, respectively, disposed above and below the path of document travel. Extending around the pair of drive rolls 14 and 15 are endless belts 16 which convey documents from a suitable source thereof, not shown, past the sensing station in the direction indicated by arrow 17. At least one of the rolls 14 or 15 is driven by suitable powering means, such as motor 18. The belts 16 have a relatively small width dimension whereby the portion of a document 12 having characters 11 printed or otherwise formed thereon is exposed to the sensing station which is located adjacent the path of document travel.

*Stylized type font and recognition principles*

The characters 11 printed on the document 12 are stylized and have shapes designed to aid in the reading and recognition process. Although a specific stylized type font and compatible recognition logic means are disclosed and offer particular advantages when employed in connection with the illustrated character recognition system, it should be clearly understood at the outset that the teachings of the present invention, in their broader aspects, are not limited to or dependent upon the use of any one stylized type font or recognition logic means.

Figures 8, 9:
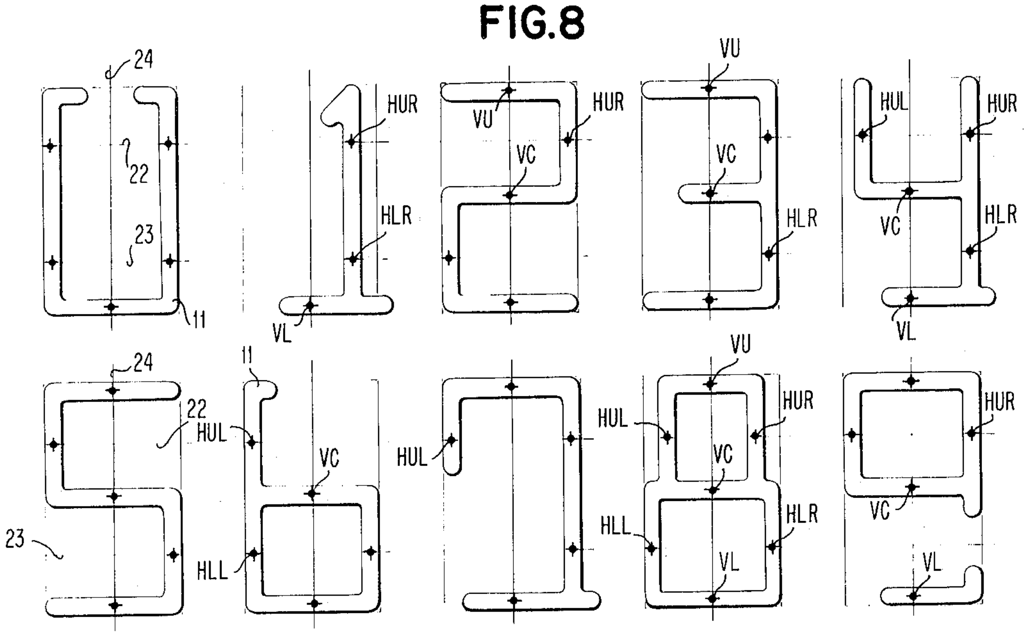
FIGURE 8 illustrates a stylized type font for the numerals 0 through 9 which may be employed with the character recognition system of this invention.
FIGURE 9 is a tabular listing of the distinguishing characteristics of the individual characters shown in FIGURE 8 of the drawings.

The numerals or characters 0 through 9 of the stylized type font are illustrated in FIGURE 8 of the drawings. Superimposed over each of the characters 11 is an imaginary matrix comprising a pair of horizontal lines 22 and 23 which are spaced apart approximately one half the vertical dimension of an individual character. Bisecting the horizontal space occupied by a character is a vertical line 24. The characters 11 are printed on the documents 12 in such a manner that the characters contrast with the backgrounds of the documents. Each of the characters 11 is defined or characterized by the presence or absence of character information at certain points along the lines 22–24. These points are the possible points of intersection of a character and the matrix.

There are seven possible points of intersection between a character and the horizontal and vertical lines 22–24 of the imaginary matrix. The symbol 8 has character information present at all seven points of intersection as is shown in FIGURE 8 of the drawings. For purposes of convenience in the following description, the possible points of intersection of the line 24 with respect to a character 11 are designated as vertical upper (VU), vertical center (VC) and vertical lower (VL). The two points of possible intersection between the upper horizontal line 22 and a character will hereinafter be referred to as horizontal upper left (HUL) and horizontal upper right (HUR). In a similar manner, the possible cross-over points of lower horizontal line 23 and a character are called horizontal lower left (HLL) and horizontal lower right (HLR). Thus, the character 8 is defined as having character information at all of the possible points of intersection—VL, VC, VU, HUL, HLL, HUR and HLR. The sensing of character information at points HUR, HLR and VL coupled with the absence of such information at all other possible points ($\overline{VC}$, $\overline{VU}$, $\overline{HUL}$ and $\overline{HLL}$) indicates that the numeral 1 has been read. The use of one of the above reference indicia by itself, such as VU, indicates the presence of character information at a particular cross-over point while the same symbol with a bar over it, such as $\overline{VU}$, indicates the absence of character information at that point.

The characteristics of and the recognition requirements for each of the stylized numerals 0 through 9 are listed in table form in FIGURE 9 of the drawings. These character definitions are different for each of the characters and, in fact, each character of the stylized type font is represented by a certain combinational series corresponding to the presence or absence of character information at the possible points of intersection of the character with the matrix which is different from the series representing any other character by at least two changes. This arrangement greatly enhances the operation of the character recognition system since the loss or addition of a signal corresponding to the presence or absence of character information at one of the points of intersection will not result in an output indication of an erroneous character or the substitution of one character for another.

Each of the characters has character information at the point of intersection VL (first column in the table of FIGURE 9) which represents a strong horizontal line at the bottom of each character. Further, each of the characters has a strong vertical line on the right side thereof (represented by the presence of information at either or both of the points HUR or HLR). The strong horizontal line at the bottom and the strong vertical line at the right side of each character assist in sensing the vertical and horizontal registration of a character as will be later explained. While the stylized font and the principles of recognition disclosed above offer many advantages when employed with the character recognition system of this invention, the system is not specifically limited to the use of any particular font or recognition scheme. It will be apparent to those skilled in the art that the character recognition system may be employed with a wide variety of type fonts based on various recognition concepts or principles.

*Sensing station*

Referring now to FIGURES 1–7 of the drawings, the sensing station 10 comprises an optical system 27, a horizontal registration station 28, a horizontal reading station 29, a vertical registration station 30 and a vertical reading station 31. A character 11 (integer 7 of the number 373 in the illustrated embodiment) on a document 12 at the sensing station is illuminated by lamp 34 and images 35 of the character are transmitted to the reading and registration stations 28–31. Disposed in a compact encircling arrangement about the lamp are four lenses 36—three of which directly project images 35 of the character to the horizontal registration station 28, the horizontal reading station 29 and the vertical reading station 31. An additional lens 38 is associated with the remaining lens 36 whereby the image 35 of the character projected to the vertical registration station 30 is inverted with respect to the images at the other stations.

The reading and registration stations 28–31 are defined by cooperating transparent apertures in an otherwise opaque rotating disc 40 and an otherwise opaque masking plate 41. The disc 40 is attached to the end of a shaft 43 which is rotated at a high speed by motor 44 in the direction indicated by arrow 45. Stationarily mounted behind the scanning disc is the annular masking plate 41 through which the shaft 43 extends.

The horizontal registration station 28 is defined by a pair of cooperating apertures 46 and 47 in the disc 40 and the masking plate 41. These apertures are located at the same radial distance from the coincident center axes of the rotating disc 40 and masking plate 41 generally along and adjacent one end of a diameter 48. The aperture 46 in the rotating disc is a slit extending vertically for the position shown while the aperture 47 in the masking plate is a larger rectangular slit extending in the same direction. Mounted on the masking plate 41 in overlying relation with respect to the aperture 47 is an optical-to-electrical transducer 49, such as a silicon photovoltaic cell. The apertures 46 and 47 are aligned for a short time interval during each revolution of the rotating disc 40 whereby optical information is transmitted to the transducer 49. During the time interval when the aperture 46 and 47 are aligned, the electrical signal from the transducer 49 experiences a detectable change when the strong leading right edge (the presence of character information at either or both of points HUR or HLR) of the projected character image is detected to indicate the horizontal registration of the character 11 at the sensing station. The apertures extend vertically for a distance which is considerably greater than the height of the projected image of the character whereby the sensing of the horizontal registration or position of a character is accomplished independently of the vertical registration or position of the character. The vertical positions of the projected images of a character properly positioned vertically are represented by the lines 50 in FIGURE 3 of the drawings.

Figures 4, 5, 6, 7:
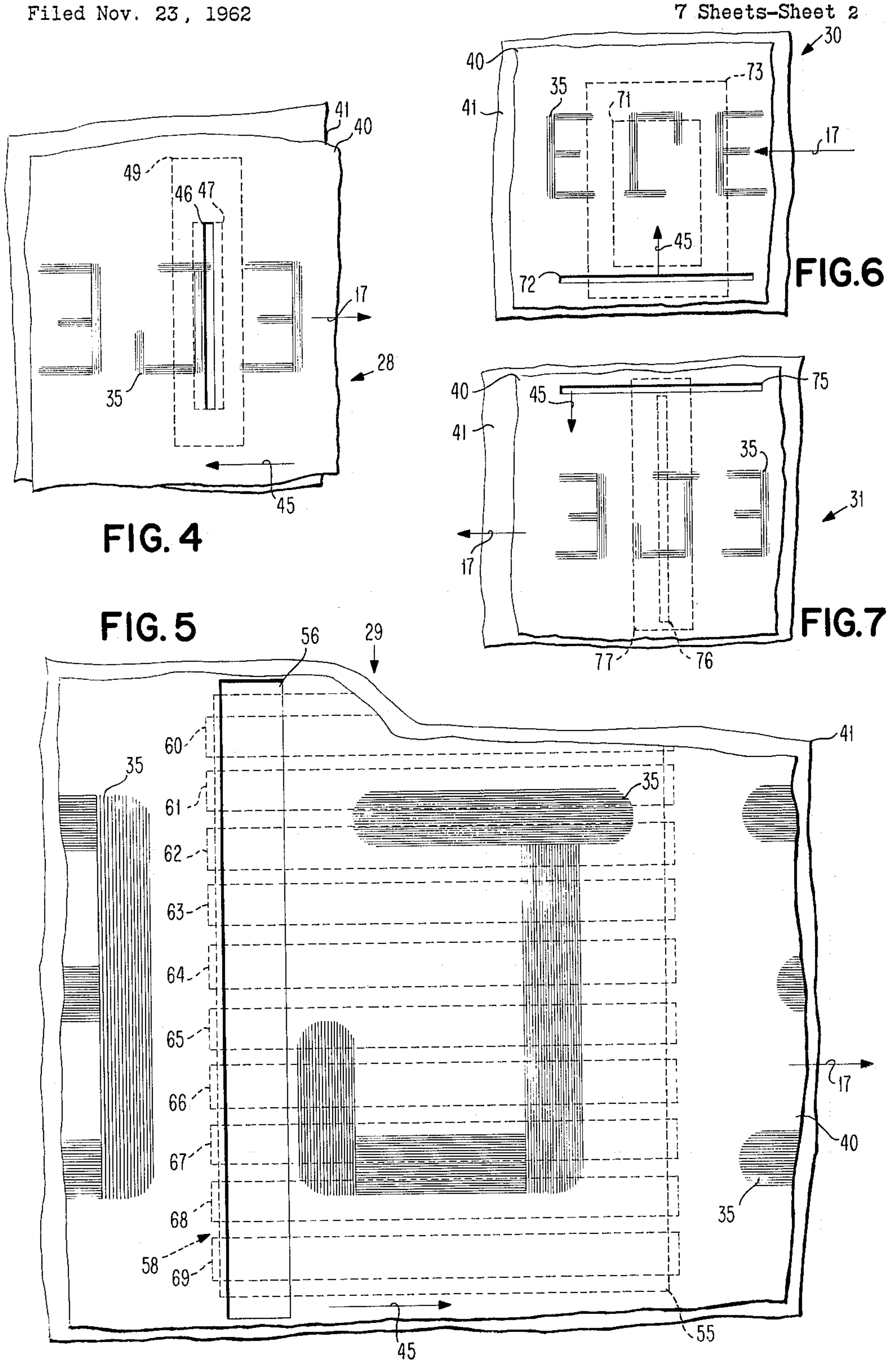
FIGURE 4 is an enlarged and fragmentary plan view of the horizontal registration station employed in the apparatus of FIGURE 1.
FIGURE 5 is an enlarged plan view of the horizontal reading station.
FIGURE 6 is an enlarged and fragmentary plan view of the vertical registration station.
FIGURE 7 is an enlarged plan view of the vertical reading station.

Referring now to FIGURE 5 of the drawings, the horizontal reading station 29 comprises a large rectangular aperture 55 in the masking plate 41 and a vertical slit 56 in the rotating disc 40. The apertures 55 and 56 are positioned generally along the diameter 48 in opposed relation to the horizontal registration station 28. The slit 56 is adapted to move across the large aperture 55 in the masking plate once each revolution of the rotating disc. The slit 56 has a vertical dimension considerably greater than the vertical height of the projected character image, and the aperture 55 is larger than the size of an individual character image so that the horizontal reading operation proceeds relatively independently of the horizontal and vertical registration of the character.

Mounted on the masking plate 41 in overlying relation with respect to the large rectangular aperture 55 is a transducer assembly 58 comprising ten horizontal extending and vertically spaced parallel strip-like photosensitive elements 60–69. This transducer assembly 58 may be formed from a single silicon photovoltaic cell by selectively removing areas of the sensitive surface thereof. The spacing between every fourth one of the strip-like photosensitive elements is equal to one half of the vertical dimension of the image of a character. Depending on the vertical registration of a character being read, one of the pairs 60–63, 61–64, 62–65, 63–66, 64–67, 65–68 or 66–69 of the photosensitive elements will correspond to the horizontal lines 22 and 23 of the matrix shown in FIGURE 8 of the drawings. For the image of the character 7 positioned as illustrated, the photosensitive elements 63 and 66 correspond to the lines 23 and 22 of the matrix. The vertical registration of a character at the sensing station as sensed by the vertical registration station 30 determines which pair of the photosensitive elements provides the horizontal information concerning the character. The photosensitive elements 60–69 are sampled twice during the movement of the slit 56 across the character image in a manner dependent on the horizontal registration of the character to provide sufficient information to determine the presence or absence of character information at the points HUL, HLL, HUR and HLR.

Disposed generally along and adjacent the end of a diameter 70 is a relatively large rectangular aperture 71 in the stationary masking plate 41 and a horizontal slit 72 in the rotating disc 40 which define the vertical registration station 30. Mounted on the masking plate in overlying relation with respect to the aperture 71 is a transducer 73. The aperture 71 is of sufficient size to accommodate at least the lower portion of the projected image of the character at the sensing station in a manner relatively independent of the vertical and horizontal registration of the character. The horizontal slit 72 sweeps across the image of the character and the signal from transducer 73 experiences a measurable change when the strong bottom edge (corresponding to the presence of character information at point of intersection VL) is sensed to provide an indication of the vertical registration of the character.

The transducer 73 is shown in FIGURE 1 of the drawings to be connected in series with a video amplifier 74 and an inverter 75. The video amplifier is preferably provided with appropriate threshold control features whereby ink splatters on the documents and other extraneous variables do not affect the operation of the character recognition system. Each of the transducers at the reading and registration stations, including each of the photosensitive strip-like elements 60–90, and the transducer at the timing station to be later described has an amplifier and inverter associated therewith. When the slits or apertures of a reading or registration station are aligned and no character information is present, the output of the inverter will be at a constant voltage level. However, when the station senses the presence of character information, the output of the inverter will rise to a different and more positive voltage level.

The vertical reading station 31 comprises a horizontal slit 75 in the rotating disc 40 and a vertical slit 76 in the masking plate 41 which cooperate to define a single vertical sweep across the image of a character corresponding to the vertical line 24 of the matrix shown in FIGURE 8 of the drawings. A transducer 77 is mounted on the masking plate in overlying relation with respect to the slit 76 and provides signals representing the presence or absence of character information at the points VC and VU.

Signals representing the character information at point VL are also provided but are not necessarily required since the strong lower edge of each character is also sensed by the vertical registration station 30.

In addition to the above-described transparent apertures and transducers defining the reading and registration stations, a plurality of angularly related timing apertures 80 are provided in the rotating disc 40. The masking plate 41 has a cooperating aperture 81 therein and mounts a timing transducer 82 behind this aperture. The arrangement is such that a predetermined number of timing pulses (8 in the illustrated embodiment) are produced for each complete revolution of the rotating disc 40. Further, one of these pulses, which may be referred to as the home pulse, occurs once each revolution of the rotating disc when the images of a character are at the reading and registration stations and the slits 46, 56, 72 and 75 in the rotating disc have moved within the areas allotted to the images of a single character to begin character sensing operations.

*Recognition circuit means*

Referring now to FIGURES 10–13 of the drawings, there is shown in schematic form circuit means for processing the signals coming from the transducer assemblies of the reading and registration stations to provide an output indication of the read character. The disclosed circuits employ conventional digital circuit components, such as AND logic blocks, OR logic blocks, inverters, delay devices, single shot multivibrators, triggers and binary counters. The construction and operation of these components by themselves is well known in the art and will not be described in detail in this specification. A delay device accomplishes a delay function in that a signal applied to the input thereof will appear at the output after a preselected delay interval. A trigger is a binary storage device which is settable in either of two stable states in response to the signals applied to the set and reset input terminals thereof. The single shot multivibrators employed in the illustrated embodiment respond to the trailing edge of a positive pulse input to provide a positive pulse output which extends for a preselected time interval. A single shot multivibrator of this general type is disclosed on page 89 of the "IBM Customer Engineering Manual of Instruction—Transistor Component Circuits," which was published in 1960 by International Business Machines Corporation, 590 Madison Avenue, New York, N.Y. Examples of other digital circuit components are also set forth in this manual.

As a document 12 having characters 11 printed thereon moves toward the sensing station 10, suitable control circuits, not shown, are actuated to provide a start pulse 89 (see FIGURE 13 of the drawings) which is applied over conductor 90 to OR logic block 91. The output of the OR logic block 91 sets a trigger 92 so that a positive voltage level corresponding to the binary one is applied to one input of AND logic block 93. The other input to AND logic block 93 is connected to the output of transducer 82 and receives the timing pulses 94 supplied therefrom. Shortly after the start pulse 89 sets trigger 92, the home timing pulse 94 occurs which indicates the slits 46, 56, 72 and 75 in the rotating disc 40 are within the areas surrounding the reading and registration stations wherein the projected images of a character are present. This home timing pulse enables AND logic block 93 so that trigger 95 is switched to its set state and a positive-going signal is supplied to delay device 96 and one input of a horizontal registration AND logic block 97. The delay device provides a signal via OR logic block 99 after a preselected time interval to reset or turn off trigger 95 if the same has not already been reset by the prior occurrence of a horizontal registration signal.

Signal 101 from transducer 49 of the horizontal registration station 28 is transmitted over conductor 102 to the other input of horizontal registration AND logic block 97 and also to OR logic block 99 for resetting trigger 95. The trigger 95, as shown by waveform 103, will remain in its set state from the occurrence of home timing pulse 94 until the first positive-going signal is provided from horizontal registration station 28 or, in the absence of such a signal, the delay device 96 provides a reset pulse. The AND logic block 97 is enabled when the horizontal registration station 28 senses the strong right edge (the presence of character information at points HUR and/or HLR) of the character image being scanned by cooperating apertures 46 and 47. The signal from AND logic block 97, which is an indication the horizontal registration of the character at the sensing station has been sensed, is coupled to a single shot multivibrator 104. The single shot multivibrator 104 produces a gating pulse 105 on conductor 106 of predetermined duration starting when the signal from the AND logic block 97 goes from the binary one to the binary zero voltage level. The gating pulse 105 is also applied to a single shot multivibrator 107 so that a gating pulse 108 of predetermined duration appears on conductor 109. The successively occurring gating pulses 105 and 108 are used to control the sampling of the signals coming from the strip-like photosensitive elements 60–69 associated with the horizontal reading station 29.

The signal from horizontal registration AND logic block 97 resets start trigger 92 so that AND logic block 93 cannot be enabled until trigger 92 is again set. In addition, a trigger 111 is switched to its set state by the signal from AND logic block 97 whereby the next timing pulse 94 is applied through AND logic block 112 to the input of a three-stage binary counter 113. The binary counter may comprise three interconnected bistable storage devices or triggers and has a capacity of seven pulses with the seventh input pulse resetting the counter to its initial state and providing a signal on conductor 114 which is used to reset trigger 111 and set trigger 92. Since eight timing pulses 94 are produced for each complete revolution of the rotating disc 40, the AND logic block 93 is energized by each consecutive eight or home timing pulse 94 which indicates the slits 46, 56, 72 and 75 in the rotating disc are adjacent the registration and reading stations 28–31. The binary counter 113 keeps track of the intermediate seven timing pulses 94 and prevents the same from initiating a character recognition operation.

The positive-going signal occurring when AND logic block 97 is energized sets a trigger 116 to provide a gating signal 117 to vertical registration AND logic block 118 via conductor 119. The gating signal 117 is supplied to delay device 120 so that the trigger 116 will be reset through OR logic block 121 after a predetermined time interval if this trigger has not already been returned to its original state. The OR logic block 121 and vertical registration AND logic block 118 receive signal 122 over conductor 125 from the tranducer 73 associated with vertical registration station 30. Trigger 116 is reset and AND logic block 118 is enabled by the first positive-going signal from transducer 73 occurring within a predetermined time interval defined by the inherent delay of delay device 120 to indicate that the strong bottom edge of a character image at the vertical registration station 30 has been sensed.

The position or registration of a character at the sensing station is determined in a successive manner with respect to two angularly related axes. The horizontal position of a character is sensed and this in turn controls the sensing of the vertical position of the character. The horizontal registration AND logic block 97 must be energized before the vertical registration AND logic block 118 can be enabled. The slits 46 and 72 in the rotating disc 40 are angularly related with respect to each other so that slit 46 begins moving across the character image associated with horizontal registration station 28 prior to vertical movement of slit 72 over the character image at the vertical registration station 30.

When AND logic block 118 is enabled, a signal is provided on conductor 127 which indicates that character information at the point VL has been sensed for the character at the sensing station. Since each of the stylized numerals 0 through 9 has character information at the point VL, the AND logic block 118 must be energized for the completion of a valid character recognition operation.

In the recognition process, it is necessary to generate signals corresponding to the presence or absence of character information at the points VU and VC. The signal 128 from the transducer 77 associated with the vertical reading station 31 is applied over conductor 129 directly to AND logic blocks 130 and 131. The other input to AND logic block 130 is derived from a single shot multivibrator 137 which provides a gating pulse 138 of predetermined duration when vertical registration AND logic block 118 is enabled. The positive pulse from single shot multivibrator 137 lasts for a time interval corresponding to the movement of horizontal slit 75 across the center portion of the character image (point VC) at the vertical reading station 31. If character information is present at the point VC for the character at the sensing station, the resultant pulse from transducer 77 will energize AND logic block 130 to set trigger 140. The output signal from trigger 140 is supplied to an inverter 141. In this manner, the signal from trigger 140 will be at the binary voltage level when character information is present at the point VC for the character at the sensing station. If no character information is present at point VC, then the output signal from inverter 141 will be at the more positive voltage level.

The signal from single shot multivibrator 137 drives a single shot multivibrator 144 that provides a positive gating pulse 145 to AND logic block 131. If character information is present at point VU for the character image at the vertical reading station, trigger 147 is set and the signal from inverter 148 goes to the binary zero voltage level. The lack of character information at the point VU for a character at the sensing station means that trigger 147 will remain in its reset state and the signal from inverter 148 will be at the binary one level. After the horizontal slits 72 and 75 of the vertical registration station 30 and the vertical reading station 31 have swept across the character images, the condition of triggers 140 (VC)–147 (VU) and inverter 141 $\overline{(VC)}$–148 $\overline{(VU)}$ will indicate character information corresponding to the selected points VC and VU along line 24 of the matrix. For the character 7 shown in the illustrated embodiment of the invention, the trigger 147 will be set and trigger 140 will remain in its reset condition.

Figure 11:
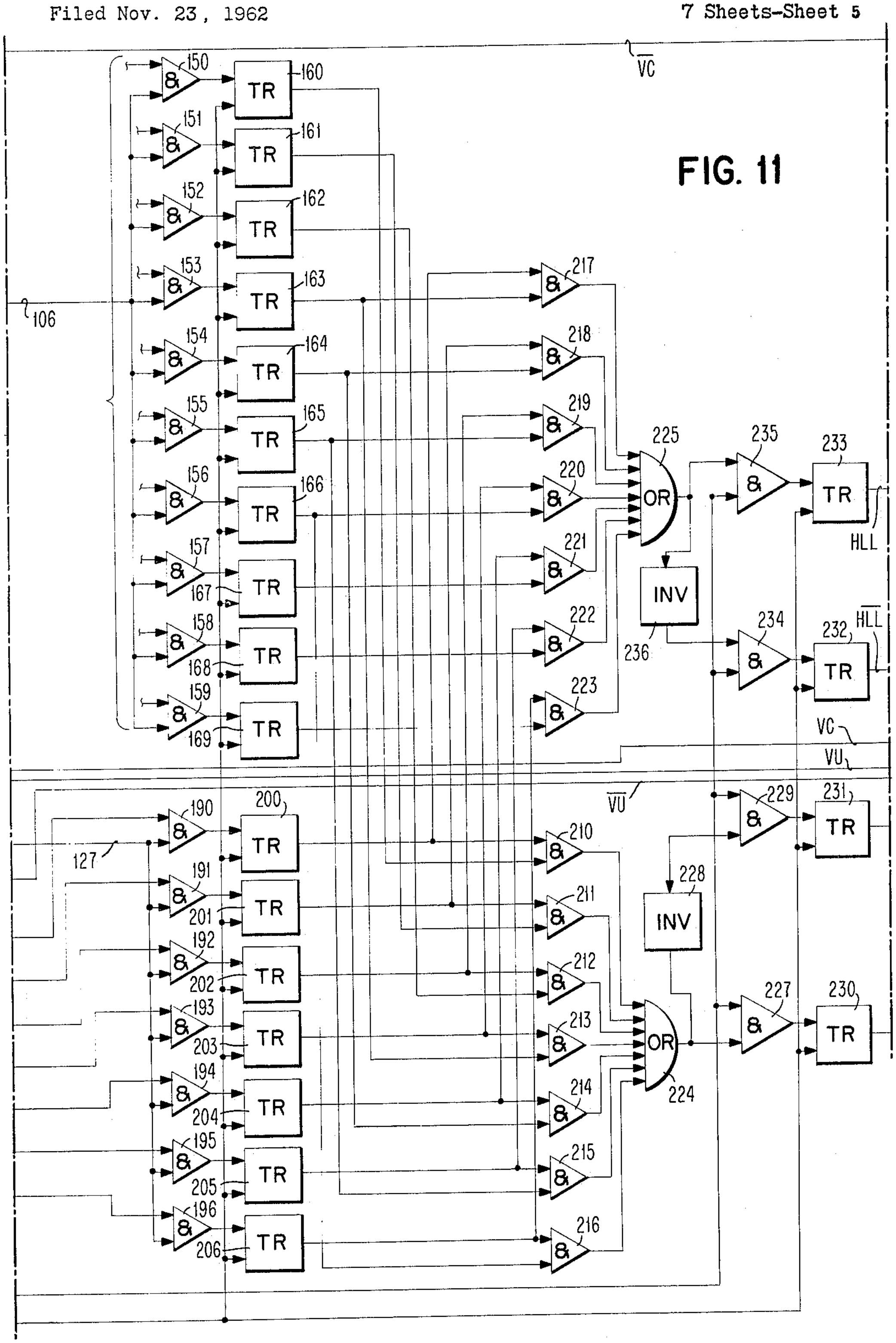

As previously explained, the horizontal reading station 29 comprises a transducer assembly 58 having a plurality of strip-like photosensitive elements 60–69. The spacing between every fourth one of the photosensitive elements corresponds to one-half the vertical dimension of a character image at the horizontal reading station. One of the pairs 60–63, 61–64, 62–65, 63–66, 64–67, 65–68 or 66–69 of the photosensitive elements corresponds to the lines 22 and 23 of the matrix, depending on the vertical registration of the character at the sensing station. The signal from each of the photosensitive elements 60–69 is sampled twice as the vertical slit 56 moves across the character image to determine the presence or absence of character information at the points HUL, HLL, HUR and HLR in the matrix. Only the circuitry necessary for defining the presence or absence of information at points HUL and HLL is shown in FIGURE 11 of the drawings. However, as will be later explained, the logic circuits for providing signals corresponding to the presence or absence of character information at point HUR and point HLR is substantially the same.

During the time interval when the gating pulse 105 is present on conductor 106, the signals from the strip-like photosensitive elements 60–69 pass through AND logic blocks 150–159 and are stored in triggers 160–169, respectively. The single shot multivibrator 104 is energized in response to the sensing of the horizontal position or registration of a character at the sensing station, and gating pulse 105 lasts only while the vertical slit 56 moves across the portion of the character image at horizontal reading station 29 corresponding to the vertically aligned points HUL and HLL of the matrix. The triggers 160–169 provide a temporary storage means for the character information sensed along one vertical line extending across a character at the horizontal reading station. A pair of these triggers, corresponding to the pair of photosensitive elements aligned with lines 22 and 23 of the matrix, are thereafter sampled to provide signals representative of the character information at points HUL and HLL.

Figure 10:
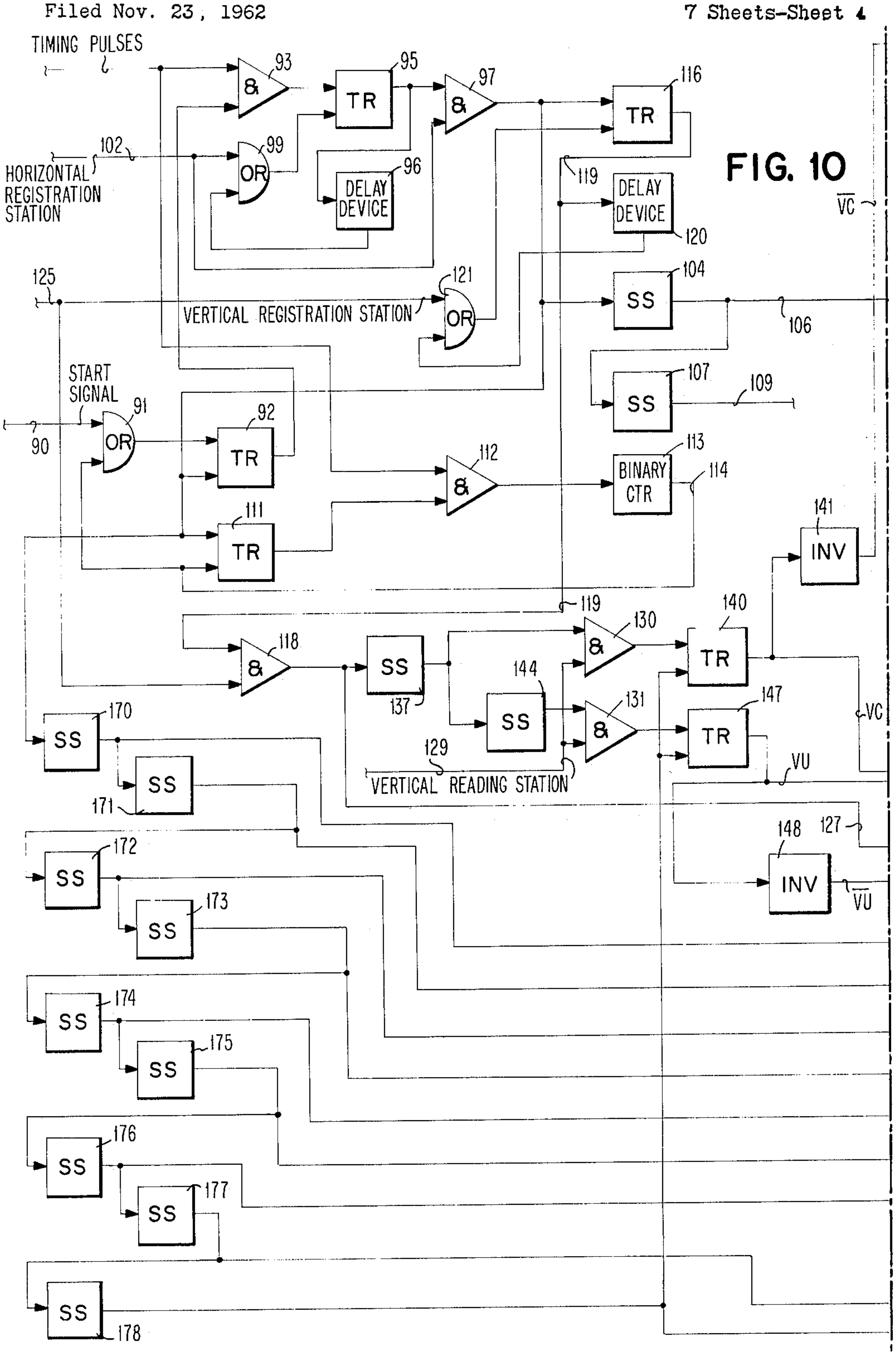
FIGURES 10 and 11 are schematic diagrams of the circuit means employed for processing the electrical signals supplied from the reading and registration stations to provide signals corresponding to the distinguishing characteristics of a character at the sensing station.

As shown in FIGURE 10 of the drawings, the output signal from horizontal registration AND logic block 97 is applied to the first of a number of cascaded and series connected single shot multivibrators 170–178. The single shot multivibrators 170–176 provide a series of successive positive output pulses 180–186. The series of pulses 180–186 from the single shot multivibrators 170–176 occur after and in timed relation with respect to the energization of AND logic block 97 corresponding to the horizontal registration of a character at the sensing station. The single shot multivibrators 177 and 178 define successive recognition logic gating and logic reset pulses 187 and 188. The latter pulses are used to gate the recognition logic after information concerning all of the selected matrix points has been obtained and to reset certain of the digital circuit components after a character has been recognized.

The outputs from the single shot multivibrators 170–176 are combined in a series of AND logic blocks 190–196 with the signal on conductor 127 supplied from AND logic block 118. Only one of the AND blocks 190–196 will be enabled, depending upon which of the single shot multivibrators 170–176 is providing a gating pulse when the vertical position or registration of the character at the sensing station is determined. For the image of the character 7 positioned as shown in FIGURE 5 of the drawings, the AND logic block 193 is energized since the gating pulse 183 is present when AND logic block 118 is energized. The output of AND logic block 193, corresponding to the selection of photosensitive strips 63 and 66, sets a trigger 203. The remaining triggers 200, 201, 202, 204, 205 and 206 are not set since their associated AND logic blocks are not enabled.

The outputs of the triggers 160–169, representing the presence or absence of character information at a plurality of points along a vertical line passing through points HUL and HLL of the matrix in accordance with the horizontal registration of the character at the sensing station, are combined in a plurality of AND logic blocks 210–223 and OR logic blocks 224–225 with the signals from triggers 200–206, representing the pair of the photosensitive elements corresponding to lines 22 and 23 of the matrix in accordance with the sensed vertical registration of the character at the sensing station. For the illustrated case, the trigger 203 is set while triggers 200, 201, 202, 204, 205 and 206 remain in their initial states. The output signal from trigger 203 is applied to a pair of the AND logic blocks 213 and 220 which also receive the signals from triggers 163 and 166 corresponding to character information sensed at points HLL and HUL by photosensitive elements 63 and 66, respectively. Since no information is present at the point HLL for the character 7, the trigger 163 is not set and AND logic block 213 is not enabled. Character information is present at point HUL so that trigger 166 is set, and AND logic block 220 is energized.

An OR logic block 224 is connected directly to AND logic block 227 and through inverter 228 to AND logic block 229. Triggers 230 and 231 are driven by the output signals from AND logic blocks 227 and 229. In a similar manner, a pair of triggers 232 and 233 are connected to AND logic blocks 234 and 235. The output of an OR block 225 drives AND logic block 235 directly and AND logic block 234 through inverter 236. The remaining input to each of the AND logic blocks 227, 229, 234 and 235 is the recognition logic gating pulse 187 produced by single shot multivibrator 177.

As described above, the AND logic block 213 is not energized for the illustrated case of the character 7 so that trigger 231 is set while trigger 230 remains in its initial state upon the occurrence of recognition logic gating pulse 187. The conditions of triggers 230 and 231 indicate the presence or absence of character information at the point HUL in the matrix for the character at the sensing station. The AND logic block 220 is enabled, and a pulse output is applied by AND logic block 235 when recognition gating pulse 187 occurs to set trigger 233. The trigger 232 will not be set since AND logic block 234 will not be enabled due to the action of inverter 236. The states of the triggers indicate the presence of character information at point HLL for the character 7. The arrangement is such that the conditions of triggers 230–233 represent the signals HUL, $\overline{HUL}$, $\overline{HLL}$ and HLL, respectively, for a character at the sensing station, and these signals are available for further processing.

Circuitry similar to that shown in FIGURE 11 of the drawings is employed for generating the signals HUR, $\overline{HUR}$, HLR and $\overline{HLR}$. The signal supplied to each of the AND logic blocks corresponding to AND logic blocks 150–159 is the gating pulse 108 transmitted over conductor 109 from single shot multivibrator 107. The gating pulse 108 occurs during the time interval when the vertical slit 56 is aligned and overlies the points HUR and HLR for the image of the character at the horizontal reading station 29. The series of triggers corresponding to triggers 160–169 temporarily store the signals from photosensitive elements 60–69 representing the presence or absence of character information along a vertical line passing through points HUR and HLR for the image of a character at the horizontal reading station. After the occurrence of the recognition gating pulse 187, four triggers corresponding to triggers 230–233 provide the signals HUR, $\overline{HUR}$, HLR and $\overline{HLR}$ for a character at the sensing station. The circuitry for generating these signals is identical to the circuitry disclosed for providing signals HUL, $\overline{HUL}$, HLL and $\overline{HLL}$ with the exception that gating pulse 108 is employed rather than gating pulse 105.

Information concerning the presence or absence of character information is provided for all possible points of intersection between a character and the matrix shown in FIGURE 8 of the drawings. The signals from triggers 140 (VC), 147 (VU), 230 (HUL), 231 ($\overline{HUL}$), 232 ($\overline{HLL}$) and 233 (HLL); the signals from inverters 141 ($\overline{VC}$) and 148 ($\overline{VU}$); and the signals HUR, $\overline{HUR}$, HLR and $\overline{HLR}$ provided by triggers corresponding to triggers 230–233 are supplied to and combined in a recognition logic matrix generally designated by the reference numeral 259 and shown in FIGURE 12 of the drawings. The signal VL is not generated and does not serve as an input to the recognition logic matrix since each valid character must have information at this point (a strong bottom edge) and the vertical registration AND logic block 118 must be enabled before a character recognition operation can be completed.

The recognition logic matrix 259 comprises a series of AND logic blocks 260–269 which combine the signals representing the presence or absence of character information at the selected points. One of the AND logic blocks 260–269 is associated with and corresponds to each of the characters 0 through 9. For example, the AND logic block 260 is energized to provide an output indication of the character 0 when the signals $\overline{VC}$, $\overline{VU}$, HUL, HLL, HUR and HLR are all at the more positive voltage level. This combinational series of signals corresponds exactly to the distinguishing characteristics for the character 0 listed in the first horizontal line of the table of FIGURE 9 of the drawings. Therefore, when one of the character statements has been satisfied, an automatic indication is provided of the character at the sensing station. Since the signals $\overline{VC}$, VU, HUL, $\overline{HLL}$, HUR and HLR are at the binary one level for the illustrated case, the AND logic block 267 will be enabled to provide a signal representing the recognition of the character 7.

As mentioned earlier in the specification, each of the characters is represented by a combinational series of signals which is different from the series corresponding to any other character by at least two changes. If a series generated from one character has an error due to an indication of character information at one point where such information is not present or due to an indication of the lack of character information at a point where such information is present, none of the AND logic blocks 260–269 will be enabled. This is highly desirable since the operation of the character recognition system is substantially error free and changes must take place in at least two signals in any combinational series before an erroneous output indication is provided.

Figure 12:
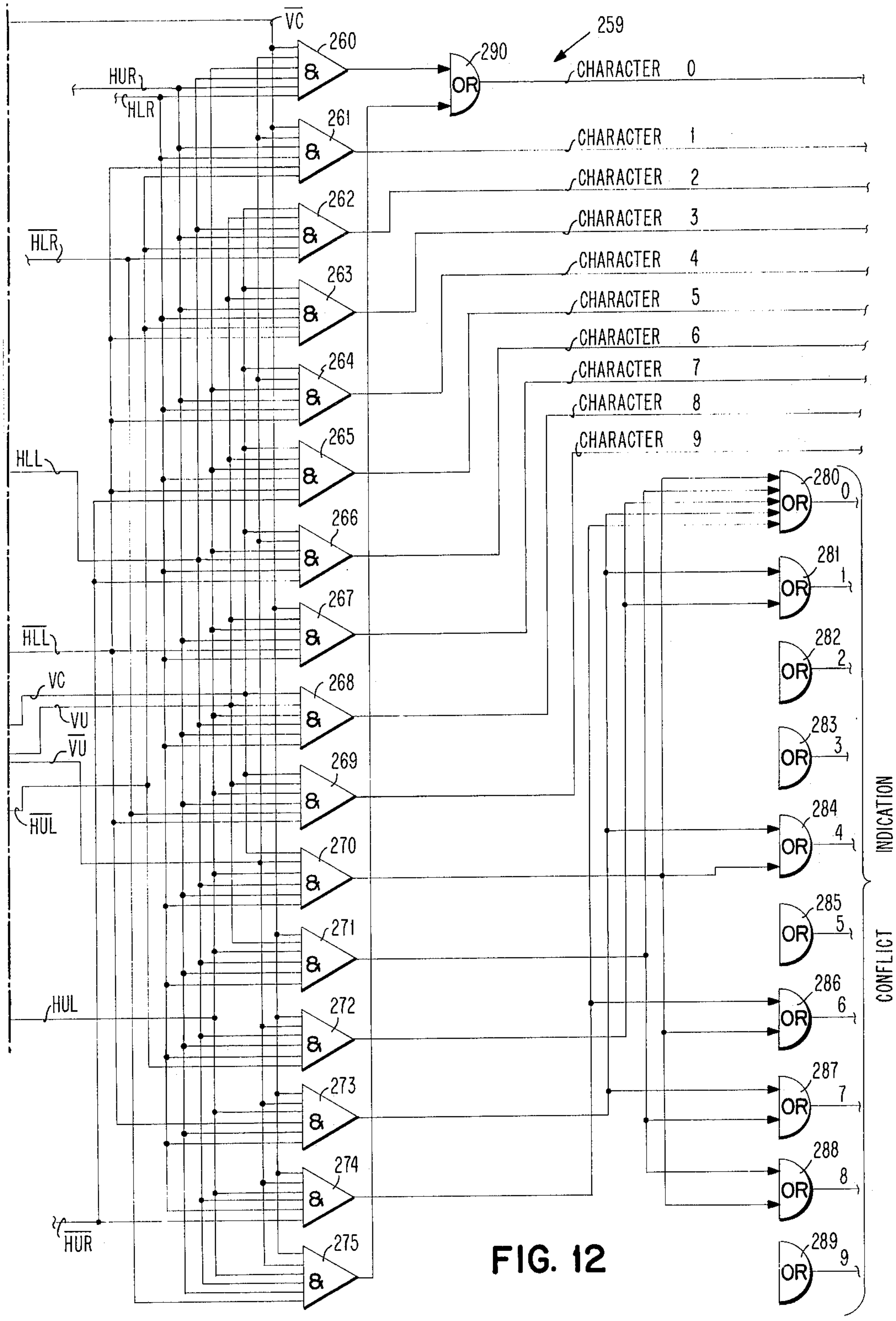
FIGURE 12 is a schematic circuit diagram showing a recognition logic matrix for converting signals corresponding to the distinguishing characteristics of a read character to an output indication of that character.
Figure 13:
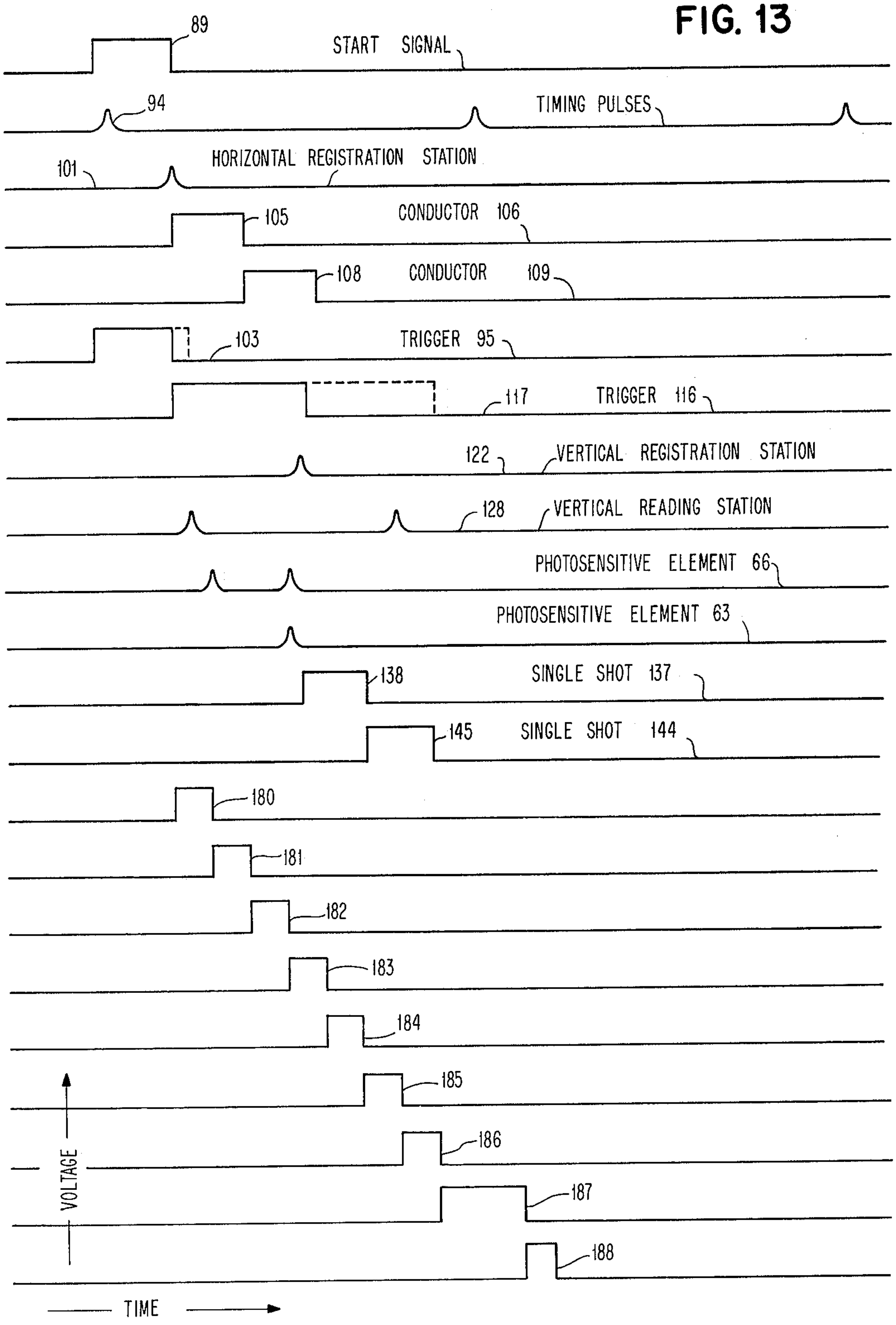
FIGURE 13 is a timing chart showing the occurrence of certain signals with respect to time which is useful in understanding the operation of the circuits shown in FIGURES 10–12.

In certain applications, it may be desirable to indicate the one or more possible characters which a combinational series of signals might represent, assuming that only one of the signals pertaining to the points VU, VC, HLL, HUL, HUR and HLR is in error. Such an arrangement is shown in FIGURE 12 of the drawings for the character 0 and similar circuitry can be derived for each of the other characters. The combinational series or expression for the recognition of the character 0 (the signals combined in AND logic block 260) is set forth below:

(a) $\overline{VC}\cdot\overline{VU}\cdot HUL\cdot HLL\cdot HUR\cdot HLR$=character 0

By permutating or taking the inverse of each of the signals individually, an additional series of six expressions can be written as follows:

(b) $VC\cdot\overline{VU}\cdot HUL\cdot HLL\cdot HUR\cdot HLR$=Possible characters 0, 4, 6 or 8

(c) $\overline{VC}\cdot VU\cdot HUL\cdot HLL\cdot HUR\cdot HLR$=0, 7 or 8

(d) $\overline{VC}\cdot\overline{VU}\cdot\overline{HUL}\cdot HLL\cdot HUR\cdot HLR$=0 or 1

(e) $\overline{VC}\cdot\overline{VU}\cdot HUL\cdot\overline{HLL}\cdot HUR\cdot HLR$=0, 1, 4 or 7

(f) $\overline{VC}\cdot\overline{VU}\cdot HUL\cdot HLL\cdot\overline{HUR}\cdot HLR$=0 or 6

(g) $\overline{VC}\cdot\overline{VU}\cdot HUL\cdot HLL\cdot HUR\cdot\overline{HLR}$=0

The character designations listed to the right of the equal signs in the Expressions *b* through *g* represent the characters whose recognition statements would be satisfied and which would be recognized assuming there was an error in any one of the signals in these expressions. For example, in the Expression *b*, if the signal VC was changed to $\overline{VC}$, the character 0 would be indicated; if the signal HLL was changed to $\overline{HLL}$, the character 4 would be indicated; if the signal HUR was changed to $\overline{HUR}$, the recognition statement for the character 6 would be satisfied and if the signal $\overline{VU}$ was changed to VU, the character 8 would be indicated. Note that, for all possible single changes of the signals in the Expression *g*, only the statement for the character 0 will be satisfied. If it is assumed that this is the only type of error which will occur, the Expression *g* may be used as an alternate logic statement for the character 0.

Each of the AND logic blocks 270–275 shown in FIG-

URE 12 of the drawings receives the signals corresponding to the terms of one of the Expressions *b* through *g*. The outputs of the AND logic blocks 270–274 are connected to appropriate ones of OR logic blocks 280–289 providing output indications of possible characters or conflict conditions in accordance with the possible characters listed to the right of the equal signs for Expressions *b* through *f*. The output of AND logic block 275 and the output of AND logic block 260 are connected to OR logic block 290 that indicates a character 0 is present at the sensing station.

It should be apparent that equations similar to the Expressions *b* through *g* can be written for each of the characters 1 through 9. Suitable logic circuit means can then be provided in accordance with these equations so that all conflict conditions are indicated. The complexity of the recognition logic circuitry will decrease for the remaining characters since, for example, the signal combinations which would cause the character 8 to degenerate into the character 0 have already been considered.

The output signals from the AND logic blocks 260–269 represent the character at the sensing station and may be used for any of a wide variety of purposes. For example, the operating mechanisms of printing apparatus or card punching apparatus may be actuated by these signals. Visual indicating means can be energized or data corresponding to the character at the sensing station may be transferred to a digital computer for further processing. After the character at the sensing station has been read, the reset pulse 187 occurs and returns certain of the triggers to their initial or reset states. The character recognition system is now ready to read and recognize the next character on the document when the same has moved into the sensing station and the next home timing pulse occurs.

*Conclusion*

It should now be apparent that the objects initially set forth have been accomplished. Of particular importance is the provision of a character recognition system which is capable of reading and recognizing misaligned characters in a substantially error-free manner. The registration or position of a character at the sensing station is determined with a high degree of accuracy with respect to a plurality of angularly related axes. The signals from the registration stations are used to control the operation of the reading stations.

Images of a character at the sensing station are transmitted to a plurality of individual reading and registration stations. The registration of the character with respect to a plurality of angularly related axes is determined in a successive manner although the scanning of the character with respect to these axes takes place simultaneously for at least a portion of the character recognition operation. In the disclosed embodiment, the rotating disc is shown to comprise a single aperture for each of the reading and registration stations. It should be understood that a plurality of angularly spaced apertures may be provided in the rotating disc for each of the registration and reading stations. This would permit the disc to be rotated at a slower speed for the same speed of document travel past the sensing station. Further, the reading and registration stations can be located to scan a character along axes which are related to each other angularly by more or less than 90°. More than two pairs of reading and registration stations may be provided when it is desired to simultaneously scan a character at the sensing station along more than two angularly related axes.

In the illustrated embodiment, eight timing pulses occur for each revolution of the scanning disc and one character is read for each revolution. Depending on the number of slits in the rotating disc, the speed of document travel, the spacing between adjacent characters on the document and the speed of the rotating disc, the disc may rotate less than one or several complete revolutions between successive character reading operations. The timing pulse generating means and the capacity of the binary counter would be designed to satisfy the requirements of a given application so that the reading operation would begin when the selected scanning apertures are adjacent the reading and registration stations and the images of a character at the sensing station are properly projected to these stations.

A highly simplified numerical type font has been disclosed for use with the character recognition system. A relatively small number of areas within a field where a character is located are examined for the presence or absence of character information. However, the scanning means at the reading stations can be designed to sense and provide output signals corresponding to the presence or absence of character information at all or any preselected combination of points within a scanning field wherein a character is located.

While the invention has been particularly shown and described with reference to a preferred embodiment thereof, it will be understood by those skilled in the art that the above and other changes in form and details may be made therein without departing from the spirit and scope of the invention.

What is claimed is:

1. In a character recognition system for recognizing human language symbols formed on a document and having different characteristics than the background of the document:

(a) a sensing station and means to transport a document past said sensing station;

(b) means at said sensing station providing electrical signals corresponding to the character; and (c) recognition logic means for processing said signals to provide an output indication of the character sensed;

the improvement comprising:

a movable and generally opaque member disposed in spaced relation with respect to a document at said sensing station;

said movable member having a plurality of angularly spaced transparent apertures therein;

said apertures in said movable member defining a plurality of angularly related reading stations;

means to move said member;

means to project an image of a character at said sensing station to each of said reading stations;

transducing means associated with each of said reading stations;

a first of said reading stations scanning an image of a character in a first direction to provide output signals corresponding to the character information at preselected areas;

a second of said reading stations scanning an image of a character in a second direction angularly related to said first direction to provide output signals corresponding to the character information at other preselected areas; and said recognition logic means combining the output signals from said transducing means at said reading stations to provide said output indication of the character sensed.

2. Apparatus according to claim 1 further characterized by:

a third of said reading stations scanning an image of a character to sense the leading edge of a character in said first direction, the transducing means of said third reading station producing signals indicative of the registration of the character in said first direction, a fourth of said reading stations scanning an image of a character to sense the leading edge of a character in said second direction, and the transducing means of said fourth reading station providing signals indicative of the registration of the character in said second direction.

3. Apparatus according to claim 2 further characterized by:

gating means controlled by and responsive to said signals from said transducing means of said third and fourth reading stations, and said gating means controlling the sampling of the signals from said transducing means of said first and second reading stations.

4. In a character recognition system for recognizing human language symbols formed on a document and having different characteristics than the background of the document:

(a) a sensing station and means to transport a document past said sensing station;

(b) means at said sensing station providing electrical signals corresponding to the character; and (c) recognition logic means for processing said signals to provide an output indication of the character sensed;

the improvement comprising:

a movable and generally opaque member disposed in spaced relation with respect to a document at said sensing station;

said movable member having a plurality of angularly spaced transparent apertures therein;

said apertures in said movable member defining at least a pair of angularly related reading stations;

means to move said member;

means to project an image of a character at said sensing station to each of said reading stations;

transducing means associated with each of said reading stations;

a first of said reading stations scanning an image of a character in a first direction to provide output signals corresponding to the character information at preselected areas;

a second of said reading stations scanning an image of a character to sense the leading edge of a character in said first direction to provide output signals indicative of the registration of a character at said sensing station; and said recognition logic means combining the output signals from said transducing means at said reading stations to provide said output indication of said character sensed.

5. Apparatus according to claim 4 further characterized by:

the apertures in said movable member defining said first reading station comprising at least one elongated slit extending in a second direction and adapted to move across an image of a character in said first direction;

the transducing means associated with said first reading station comprising a plurality of strip-like transducer elements extending in said second direction;

a third of said reading stations scanning an image of a character to sense the leading edge of a character in said second direction to provide output signals indicative of the registration of a character at said sensing station; and gating means responsive to the output signals of said second reading station for determining when the outputs of said strip-like transducer elements will be sampled and the output signals of said third reading station for determining which of the sampled outputs of said strip-like transducer elements will be employed by said recognition logic means.

6. Apparatus according to claim 5 further characterized by:

said gating means comprising at least one temporary storage device interconnected with each of said strip-like transducer elements;

conditioning means responsive to the occurrence of an output signal from said second reading station for storing the outputs of said strip-like transducer elements in the storage devices; and sampling means responsive to the time of occurrence of an output signal from said third reading station for sampling at least one of said storage devices and providing the stored and sampled information to said recognition logic means.

7. In a character recognition system for recognizing human language symbols formed on a document and having different characteristics than the background of the document:

(a) a sensing station and means to transport a document past said sensing station;

(b) means at said sensing station providing electrical signals corresponding to the character; and (c) recognition logic means for processing said signals to provide an output indication of a character sensed;

the improvement comprising:

a movable and generally opaque member disposed in spaced relation with respect to a document at said sensing station;

said movable member having a plurality of angularly spaced transparent apertures therein defining a plurality of spaced reading stations;

means to move said member;

means to project an image of a character at said sensing station to each of said reading stations;

transducing means associated with each of said reading stations;

a first of said reading stations scanning an image of a character in a first direction to provide output signals corresponding to the character information at preselected points;

a second of said reading stations scanning an image of a character to sense the leading edge of a character in said first direction to provide output signals indicative of the registration of a character at said sensing station with respect to said first direction;

a third of said reading stations scanning an image of a character to sense the leading edge of a character in a second direction to provide output signals indicative of the registration of a character at said sensing station with respect to said second direction; and gating means responsive to the output signals from said second and third reading stations for controlling the sampling of the output signals from said first reading station.

8. Apparatus according to claim 7 further characterized by:

said gating means having conditioning means requiring an output signal from said second reading station indicating the registration in said first direction before said gating means is responsive to an output signal from said third reading station indicating the registration in said second direction.

9. In a character recognition system for recognizing human language symbols formed on a document and contrasting with the background of the document:

(a) a sensing station and means to transport a document past said sensing station;

(b) means at said sensing station providing electrical signals corresponding to and representative of the character; and (c) recognition logic means for processing said electrical signals to provide an output indication of the character sensed;

the improvement comprising:

means to illuminate a character at said sensing station;

a plurality of reading stations spaced from said sensing station;

means to project an image of a character at said sensing station to each of said reading stations;

scanning means individual to each of said reading stations comprising transducing means;

the scanning means at a first of said stations scanning an image of a character at said sensing station in a first direction;

the scanning means at a second of said reading stations scanning an image of a character at said sensing station in a second direction; and said recognition logic means combining the outputs of the transducing means at said reading stations to provide said output indication of the character sensed.

10. Apparatus according to claim 9 further characterized by:

at least a portion of the scanning of the character images at said reading stations taking place simultaneously.

11. Apparatus according to claim 9 further characterized by:

means to determine the position of the character at said sensing station with respect to said first and second directions;

said means to determine comprising third and fourth reading stations each sensing and providing an output when a leading portion of a character at said sensing station appears in the direction associated therewith; and means to gate the outputs of said transducer means associated with said first and second reading stations with the outputs of said transducer means associated with said third and fourth reading stations.

12. In a character recognition system for recognizing human language symbols formed on a document and having different characteristics than the background of the document:

(a) a sensing station and means to transport a document past said sensing station;

(b) means at said sensing station providing electrical signals corresponding to the character; and (c) recognition logic means for processing said signals to provide an output indication of the character sensed;

the improvement comprising:

a plurality of reading stations spaced from said sensing station;

each of said reading stations comprising scanning means having transducing means to provide electrical signals corresponding to selected portions of the character;

the scanning means at a first of said reading stations scanning a character at said sensing station in a first direction;

the scanning means at a second of said reading stations scanning a character at said sensing station in a second direction; and said recognition logic means responding to the signals from said reading stations to provide said output indication.

13. In a character recognition system for recognizing human language symbols formed on a document and having different characteristics than the background of the document:

(a) a sensing station and means to transport a document past said sensing station;

(b) means at said sensing station providing electrical signals corresponding to the character; and (c) recognition logic means for processing said signals to provide an output indication of the character sensed;

the improvement comprising:

a plurality of reading stations spaced from said sensing station;

each of said reading stations comprising scanning means having transducing means to provide electrical signals corresponding to selected portions of the character;

the scanning means at a first of said reading stations scanning a character at said sensing station in a first direction to provide output signals corresponding to the character information at preselected areas;

the scanning means at a second of said reading stations scanning a character at said sensing station to provide an output signal indicative of the registration of the character in said first direction; and gating means responsive to said output signals from said second reading station controlling the sampling of said output signals from said first reading station.

14. Apparatus according to claim 13 further characterized by:

the scanning means at a third of said reading stations scanning a character at said sensing station to provide output signals indicative of the registration of the character in a second direction; and said gating means being responsive to said output signals from said third reading station.

15. Apparatus for scanning documents having human language symbols formed thereon to produce output signals for automatic character recognition logic means comprising:

means for illuminating a character formed on a document;

means to project images of the character to a plurality of spaced reading stations;

scanning means and transducing means associated with each of said reading stations;

said transducing means providing electrical signals corresponding to the character information present at selected areas as said scanning means scan the images of the character;

said scanning means comprising a pair of relatively movable and generally opaque members disposed in spaced relation with respect to the character;

each of said relatively movable members having a plurality of angularly spaced transparent apertures therein;

each aperture in one of said relatively movable members cooperating with at least one of the apertures in the other of said members to provide said scanning means;

means to effect relative movement between said members;

said means for illuminating comprising a source of light energy disposed in spaced relation between the character and said relatively movable members; and said means to project comprising a plurality of lens systems disposed radially outwardly of and in encircling relation with respect to said source of light energy.

16. Apparatus according to claim 15 further characterized by:

the character image projected to at least one of said reading stations being inverted with respect to the character images projected to another of said reading stations.

References Cited by the Examiner

UNITED STATES PATENTS

| | | | |
|---|---|---|---|
| 2,937,283 | 5/1960 | Oliver | 340—146.3 |
| 3,056,033 | 9/1962 | Shepard | 340—146.3 |

MALCOLM A. MORRISON, *Primary Examiner.*